(12) United States Patent
Hwang et al.

(10) Patent No.: US 12,315,536 B2
(45) Date of Patent: May 27, 2025

(54) CONTENT PROVIDING METHOD AND DEVICE FOR IMPLEMENTING THE SAME

(71) Applicant: SAMSUNG SDS CO., LTD., Seoul (KR)

(72) Inventors: Ji Hyun Hwang, Seoul (KR); Seung Hyun Yoon, Seoul (KR); Mi Suk Park, Seoul (KR); Ye Ji Kim, Seoul (KR); Hui Yeon Yang, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 45 days.

(21) Appl. No.: 18/213,991

(22) Filed: Jun. 26, 2023

(65) Prior Publication Data

US 2024/0013813 A1    Jan. 11, 2024

(30) Foreign Application Priority Data

Jul. 7, 2022    (KR) ........................ 10-2022-0083673

(51) Int. Cl.

| | |
|---|---|
| *G11B 27/34* | (2006.01) |
| *G06F 16/48* | (2019.01) |
| *G06V 10/94* | (2022.01) |
| *G06V 20/40* | (2022.01) |
| *G10L 15/04* | (2013.01) |
| *G10L 15/08* | (2006.01) |
| *G10L 15/30* | (2013.01) |
| *G10L 25/57* | (2013.01) |

(52) U.S. Cl.
CPC .............. *G11B 27/34* (2013.01); *G06F 16/48* (2019.01); *G06V 10/945* (2022.01); *G06V 20/46* (2022.01); *G06V 20/49* (2022.01); *G10L 15/04* (2013.01); *G10L 15/08* (2013.01); *G10L 15/30* (2013.01); *G10L 25/57* (2013.01); *G06T 2200/24* (2013.01); *G10L 2015/088* (2013.01)

(58) Field of Classification Search
CPC ......... G11B 27/34; G06F 16/48; G06F 18/22; G06F 16/73; G06F 16/739; G06V 10/945; G06V 20/46; G06V 20/49; G06V 30/10; G10L 15/04; G10L 15/08; G10L 15/30; G10L 25/57; G10L 2015/088; G06T 2200/24; H04N 21/47217; H04N 21/432; H04N 21/4394; H04N 21/44008; H04N 21/4722; H04N 21/845; H04N 21/8549
See application file for complete search history.

(56) References Cited

U.S. PATENT DOCUMENTS

| | | | |
|---|---|---|---|
| 2003/0115274 A1* | 6/2003 | Weber ................ | H04N 21/4788 709/206 |
| 2007/0248334 A1* | 10/2007 | Murakoshi ............ | H04H 60/27 386/326 |
| 2012/0210220 A1* | 8/2012 | Pendergast ............ | G06F 3/0482 715/716 |

FOREIGN PATENT DOCUMENTS

| | | |
|---|---|---|
| JP | 6-68168 A | 3/1994 |
| JP | 2002-64786 A | 2/2002 |
| JP | 2004-289513 A | 10/2004 |

(Continued)

*Primary Examiner* — Girumsew Wendmagegn
(74) *Attorney, Agent, or Firm* — Sughrue Mion, PLLC

(57) ABSTRACT

A content providing method performed by a computing device is provided. The content providing method includes: obtaining preview information on a plurality of sections of target content, the preview information including a keyword group associated with content of a corresponding section, and providing the preview information on the plurality of sections together with the target content.

17 Claims, 14 Drawing Sheets

(56) References Cited

FOREIGN PATENT DOCUMENTS

| | | |
|---|---|---|
| KR | 10-1156934 B1 | 6/2012 |
| KR | 10-1617098 B1 | 5/2016 |
| KR | 10-1705595 B1 | 2/2017 |
| KR | 10-2018295 B1 | 9/2019 |
| KR | 10-2021-0060127 A | 5/2021 |

* cited by examiner

CONTENT PROVIDING METHOD AND DEVICE FOR IMPLEMENTING THE SAME

CROSS-REFERENCE TO RELATED APPLICATION

This application claims priority from Korean Patent Application No. 10-2022-0083673 filed on Jul. 7, 2022 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a content providing method and a device for implementing the same, and more particularly, to a content providing method for providing information for each reproduction section of content, and a device for implementing the same.

2. Description of the Related Art

In order to find the information desired by user from the content including video or audio, it is common to perform a search by moving a reproduction time point of content and checking a thumbnail image or audio.

However, it is a task that requires a considerable amount of time to find a time point desired by the user in a long reproduction period of content.

In the case of video content, a method of moving the reproduction time point with the help of continuous thumbnail images is used, but in the case of a simple lecture or a video without a change in background, it is difficult to find the desired information using the corresponding method.

Even in the case of audio content, there was an inconvenience of having to repeat short reproduction until the desired content came out using a quantitative time passing function such as 'go back 10 seconds' and spend a lot of time.

In addition, even if the movement to the desired time point has been performed, a reprocessing and sharing task of content may be required to obtain the information desired by the user. In this process, the user saves and edits the content on a personal PC. As a result, content that requires security may be exposed, resulting in business negligence.

Therefore, there is a need for a technology for quickly finding a desired time point and moving to the time point. In addition, there is a need for a method for strengthening a security function in the reprocessing and sharing task of content.

SUMMARY

Aspects of the present disclosure provide a content providing method capable of providing information for each section of content so that desired information may be quickly obtained when searching for content, and an apparatus for implementing the same.

Aspects of the present disclosure also provide a content providing method capable of providing information on a time point at which a speaker, subject, or background is switched through an analysis of content when searching for content, and an apparatus for implementing the same.

Aspects of the present disclosure also provide a content providing method capable of deriving a plurality of keywords included in content through an analysis based on an artificial intelligence model and reprocessing the content using a desired keyword, and an apparatus for implementing the same.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a content providing method performed by a computing device. The content providing method includes obtaining preview information on a plurality of sections of target content, the preview information including a keyword group associated with content of a corresponding section, and providing the preview information on the plurality of sections together with the target content.

In some embodiments, the plurality of sections may be formed by dividing the target content based on a point at which at least one of a speaker, subject, and background image is changed.

In some embodiments, the providing of the preview information on the plurality of sections together with the target content may include displaying a representative time point for each section of the target content and keywords included in the keyword group.

In some embodiments, the content providing method may further include: receiving a selection of one or more keywords of interest among the keywords included in the keyword group displayed for each section, and providing content of interest in which content of a section corresponding to each of the selected one or more keywords of interest is combined.

In some embodiments, the providing of the content of interest may include: displaying, on one area of a screen, a keyword selection area displaying the selected one or more keywords of interest, and providing the content of interest using the one or more keywords of interest displayed on the keyword selection area.

In some embodiments, the content providing method may further include reproducing content of a section corresponding to a first keyword in response to a user input for the first keyword among the keywords included in the keyword group displayed for each section.

According to an aspect of the present disclosure, there is provided a content providing method performed by a server. The content providing method may include dividing target content into a plurality of sections, and generating and providing preview information on the plurality of divided sections, the preview information including a keyword group associated with content of a corresponding section.

In some embodiments, the plurality of sections may be formed by dividing the target content based on a point at which at least one of a speaker, subject, and background image is changed.

In some embodiments, the generating and providing of the preview information on the plurality of divided sections may include extracting a plurality of sentences from the content of each section, selecting a representative keyword for each sentence through an analysis based on an artificial intelligence model for the plurality of extracted sentences, and generating a keyword group for each section of the target content using the selected representative keyword.

In some embodiments, the content providing method may further include receiving, from a user terminal, information on one or more keywords of interest selected from the keyword group for each section of the target content, and generating content of interest by combining content of a section corresponding to each of the one or more keywords of interest using the received information on the one or more keywords of interest.

In some embodiments, the generating of the content of interest may include adding a margin section at a start time point and an end time point of each section when combining the content of the section corresponding to each of the one or more keywords of interest.

In some embodiments, the adding of the margin section at the start time point and the end time point of each section may include combining the content of each section based on a time point ahead of the start time point of each section by a first time and a time point added by a second time from the end time point of each section.

In some embodiments, the generating of the content of interest may include generating the content of interest by using a sentence corresponding to each of the selected one or more keywords of interest among a plurality of sentences extracted from the content of each section.

In some embodiments, the generating of the content of interest may include generating the content of interest by using sentences of which a degree of similarity with each of one or more keywords of interest is a reference value or more among a plurality of sentences extracted from the content of each section.

In some embodiments, the content providing method may further include storing the generated content of interest, wherein the content of interest may be set so as not to be downloaded to the user terminal.

According to an aspect of the present disclosure, there is provided a content providing device. The content providing device includes a communication unit configured to communicate with an external device, a display unit configured to display information, and a control unit configured to obtain preview information on a plurality of sections of target content, the preview information including a keyword group associated with content of a corresponding section, and to control the display unit to provide the preview information on the plurality of sections together with the target content.

In some embodiments, when a type of the target content is video, the preview information may include a video thumbnail in each section of the video.

In some embodiments, when a type of the target content is audio, the preview information may include a pre-listening clip in each section of the audio.

In some embodiments, the plurality of sections may be formed by dividing the target content based on a point at which at least one of a speaker, subject, and background image is changed.

In some embodiments, the control unit may be configured to display a representative time point for each section of the target content and keywords included in the keyword group.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
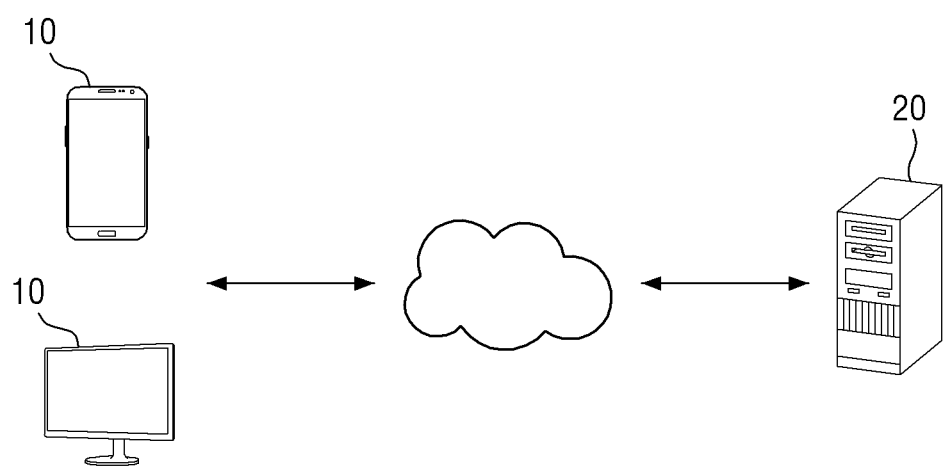
FIG. 1 illustrates a configuration of a content providing system according to an embodiment of the present disclosure.

Hereinafter, example embodiments of the present disclosure will be described with reference to the attached drawings. The advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, some embodiments of the present disclosure will be described in detail with reference to the accompanying drawings.

FIG. 1 illustrates a configuration of a content providing system according to an embodiment of the present disclosure. Referring to FIG. 1, a content providing system according to an exemplary embodiment of the present disclosure includes a content providing device 10 and a server 20, and the content providing device 10 is connected to the server 20 through a network.

The content providing device 10 may be implemented as a terminal providing information for each section of content provided from the server 20. The content providing device 10 may be, for example, any one of a mobile computing device such as a smart phone, a tablet personal computer (PC), a laptop PC, a personal digital assistant (PDA), and the like, and a fixed computing device such as a personal desktop PC.

The content providing device 10 may include a communication unit (not illustrated) communicating with the server 20, a display unit (not illustrated) displaying information, and a control unit (not illustrated), and further include additional components.

The control unit of the content providing device 10 acquires preview information for a plurality of sections of content, and controls the display unit to display the acquired preview information in each section of the content. In this case, the plurality of sections of the content may be formed by dividing the content based on a time point at which at least one of a speaker, subject, and background image is changed.

The preview information includes a keyword group associated with content of a corresponding section. In this case, the keyword group may include a plurality of keywords extracted using artificial intelligence (AI) analysis technology in the corresponding section of the content.

The preview information may be previously generated and stored in the server and then provided to the content providing device 10 at a time point of request from the content providing device 10.

As an exemplary embodiment, the control unit of the content providing device may receive a selection of one or more keywords of interest among the keywords of the keyword group included in the preview information displayed for each section of the content. Accordingly, the control unit of the content providing device 10 may transmit information on the one or more selected keywords of interest to the server 20, and may receive content of interest generated by the server 20 using the information on the keyword of interest. Here, the content of interest may be generated by combining content of a section corresponding to each of the one or more selected keywords of interest, and may be stored only in the server 20. As such, the content of interest generated by the server 20 may be provided so as to be reproduced in the content providing device 10 in real time, but may be set so as not to be downloaded to the content providing device 10.

The server 20 is a device that analyzes content to provide the preview information for each section of the content, and may be provided as a stationary computing device such as a server or a PC.

The server 20 divides the content into a plurality of sections, generates preview information on the divided sections, and provides the preview information to the content providing device 10. The server 20 may divide the content into the plurality of sections by analyzing the contents of the content using AI analysis technology such as OCR, text analysis, speech to text (STT), and video analysis technology, and extracting a time point at which the speech contents of the content or subject is switched through such an analysis.

The server 20 extracts a plurality of sentences from the content of each of the divided sections to generate the preview information. In this case, the server 20 may perform an analysis based on an artificial intelligence model for each of the extracted sentences, and extract a representative keyword for each sentence accordingly. The analysis based on the artificial intelligence model may be performed using, for example, a natural language processing model.

The server 20 may generate a keyword group in each section of the content using a plurality of extracted representative keywords, and may provide preview information including information on the generated keyword group to the content providing device 10.

Accordingly, the content providing device 10 may acquire the preview information on the plurality of sections of the content from the server. The content providing device 10 may display the preview information for each section acquired along with the content.

According to the configuration of the system of the present disclosure as described above, when searching for content, it is possible to provide information for each section of the content so that desired information may be obtained quickly. In addition, it is possible to extract the plurality of keywords included in the content through the analysis based on the artificial intelligence model, and to reprocess and provide the content using a keyword selected by a user among the plurality of keywords.

Figure 2:
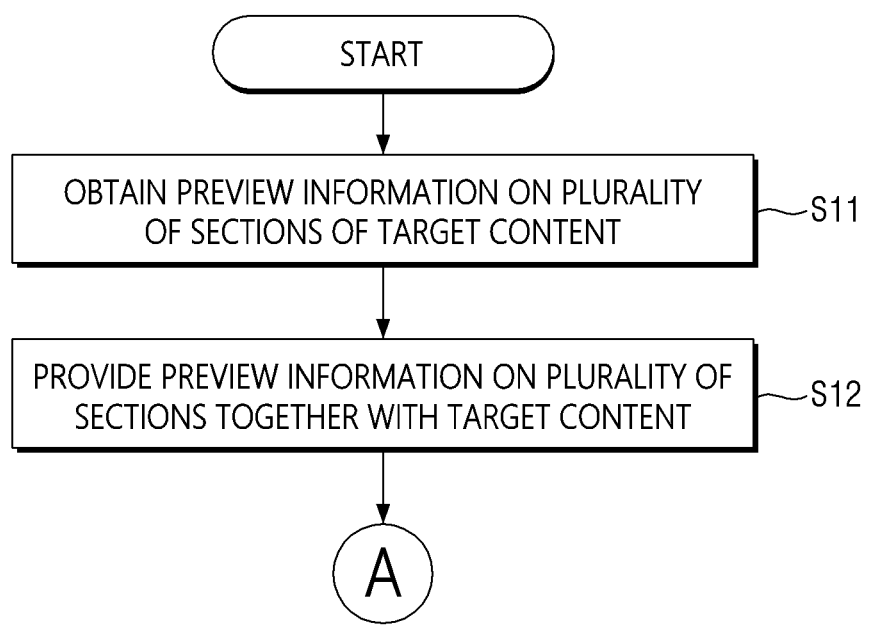
FIGS. 2 and 3 are flowcharts for explaining a content providing method performed by a content providing device according to an embodiment of the present disclosure.
Figure 3:
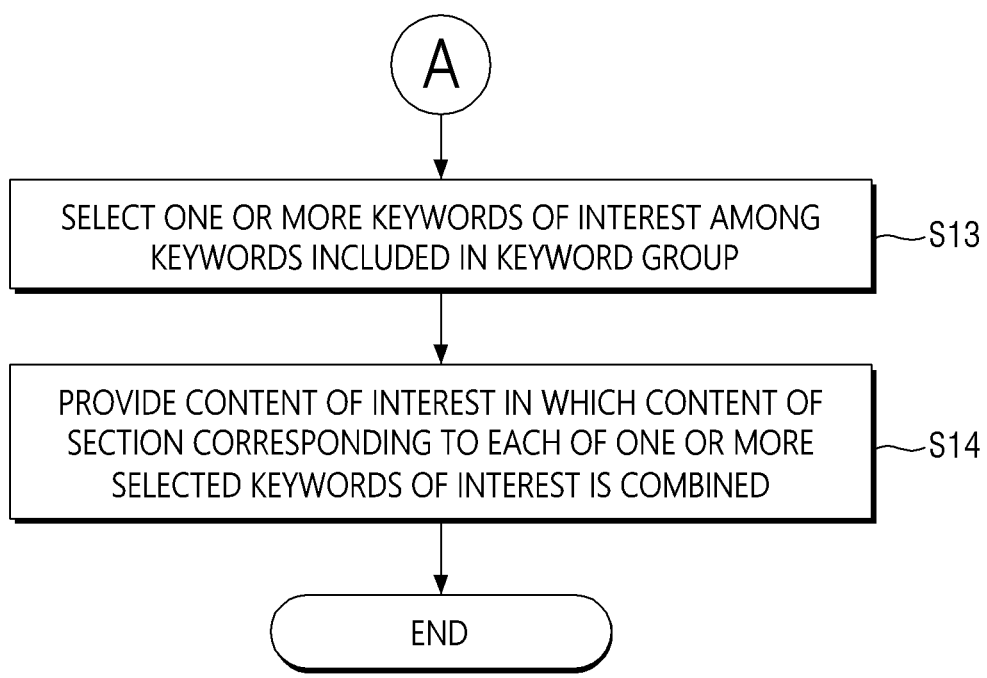

FIGS. 2 and 3 are flowcharts for explaining a content providing method performed by a content providing device according to an embodiment of the present disclosure.

A content providing method according to an exemplary embodiment of the present disclosure may be executed by the content providing device 10 illustrated in FIG. 1. The content providing device 10 that executes the method according to the present exemplary embodiment may be a computing device 100 illustrated in FIG. 14. The content providing device 10 may be, for example, a device capable of performing an arithmetic function, such as a smart phone, tablet, laptop computer, or PC.

It should be noted that description of a subject performing some operations included in the method according to an exemplary embodiment of the present disclosure may be omitted, and in such case, the subject is the content providing device 10.

According to an exemplary embodiment of the present disclosure described below, preview information for each section of target content selected by a user may be provided. In addition, newly processed content of interest may be provided using keywords selected by the user among keyword groups included in the preview information of each section.

Referring to FIG. 2, first, in operation S11, the content providing device 10 acquires preview information for a plurality of sections of target content.

The target content may be video content or audio content that may be reproduced by a user's selection.

The plurality of sections of the target content may be formed by dividing the content based on a time point at which a speaker, subject, background image, or the like is changed. That is, the content may be divided into the plurality of sections based on a time point at which the speaker is changed, a time point at which a subject or context is changed, or a time point at which the background of the video is changed among an entire reproduction section of the target content.

The preview information of each section may include a representative time point of the corresponding section and a keyword group including representative keywords extracted from content of the corresponding section. The preview information of each section may be provided from the server 20.

Next, in operation S12, the content providing device 10 provides the preview information on the plurality of sections obtained in operation S11 together with the target content. The operation S12 may include an operation of displaying a representative time point of each section for each section and a keyword group including keywords extracted from each section with respect to the entire reproduction section of the target content selected by a user input. In displaying the representative time point of each section, a start time point, a middle time point, or an end time point of each section may be displayed.

Figure 7:
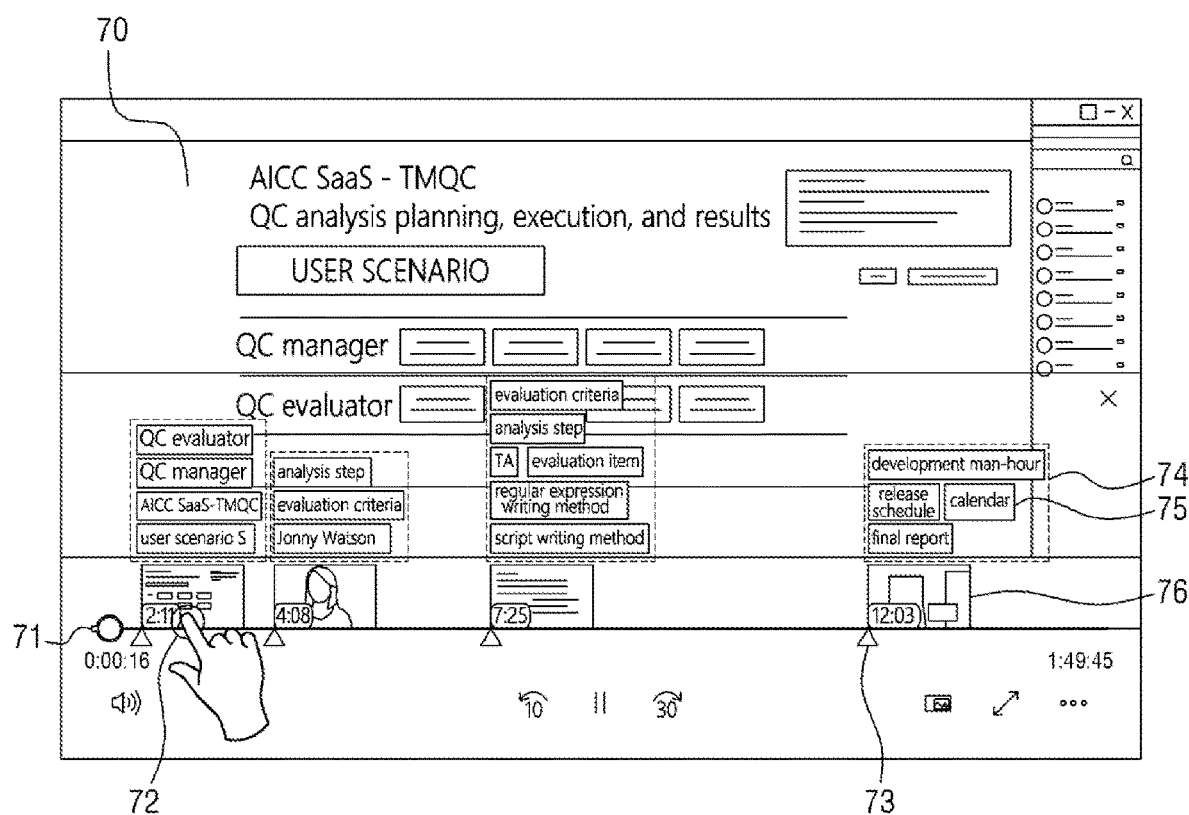
FIG. 7 is an example of displaying preview information for each section of content according to some exemplary embodiments of the present disclosure.

For example, in an example illustrated in FIG. 7, when a long-press input 72 to a play bar 71 for playing a shared video 70 is received while the content providing device 10 displays the shared video 70 of a video conference on a screen, a start time point 73 of each section and a keyword group 74 including representative keywords 75 of each section may be displayed for a plurality of sections divided based on a time point at which a subject or context is switched among an entire reproduction section of the shared video 70. In this case, a video thumbnail 76 representing each section of the shared video 70 may be displayed together. As an example, the video thumbnail may be provided using a still image at the start time point of each section.

As an exemplary embodiment, referring to FIG. 3, operations S13 and S14 may be additionally performed after operation S12 is performed.

In operation S13, the content providing device 10 receives selection of one or more keywords of interest among the keywords included in the keyword group. Accordingly, in operation S14, the content providing device 10 displays content of interest in which content of a section corresponding to each of the one or more selected keywords of interest is combined.

Figure 8:
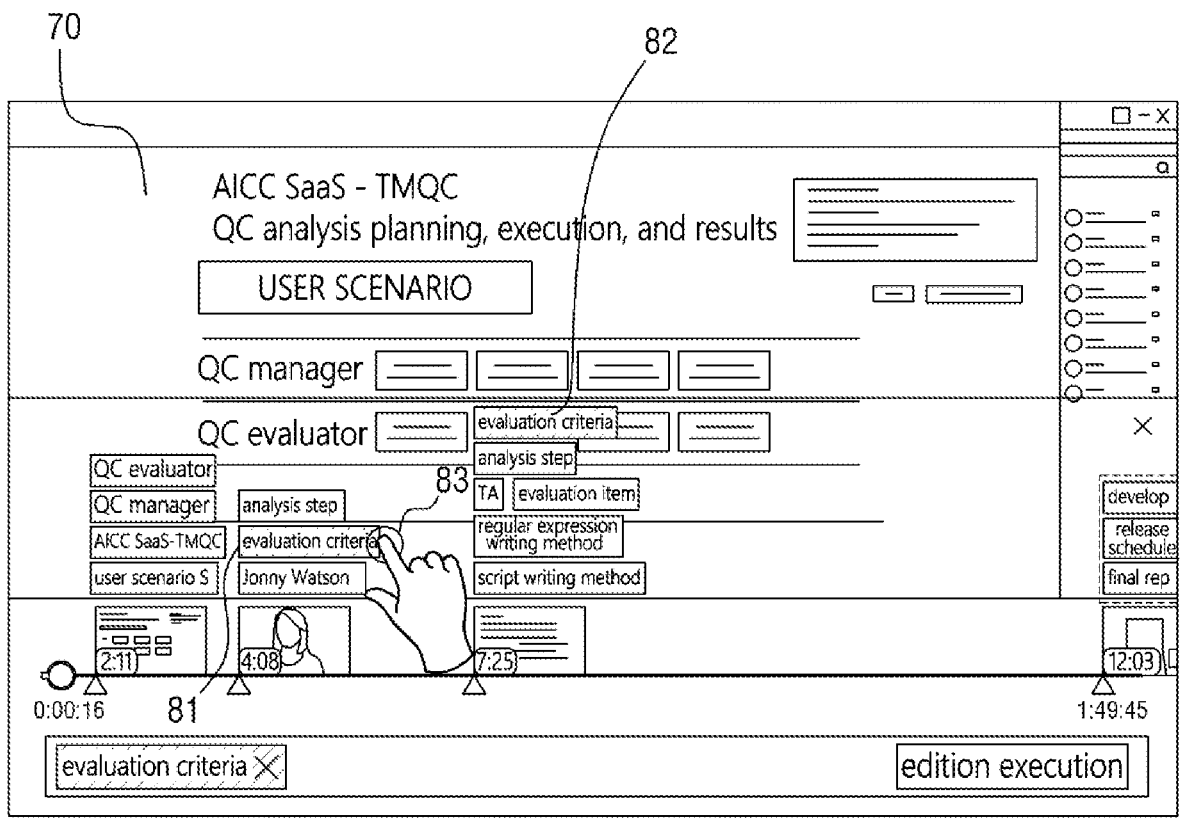
FIG. 8 is an example of selecting a keyword of interest from an entire section of content according to some exemplary embodiments of the present disclosure.

As an example, in an example illustrated in FIG. 8, the content providing device 10 may display a keyword selection area 84 on one area of the screen and display keywords selected by the user on the keyword selection area 84.

Specifically, in the state in which a start time and keywords of the keyword group are displayed for each section of the shared video 70 of the video conference, when a user's desired keyword 'evaluation criteria' 81 is selected by a long press input 83, the content providing device 10 may display a selected keyword 85 on a keyword selection area 84. In this case, all of the same keywords 82 displayed in other sections may also be displayed as selected.

As an exemplary embodiment, when the plurality of sections of the content are not displayed on the screen at the same time, the content providing device 10 may move left and right according to a user input so that sections not displayed on the screen are displayed on the screen.

Figure 9:
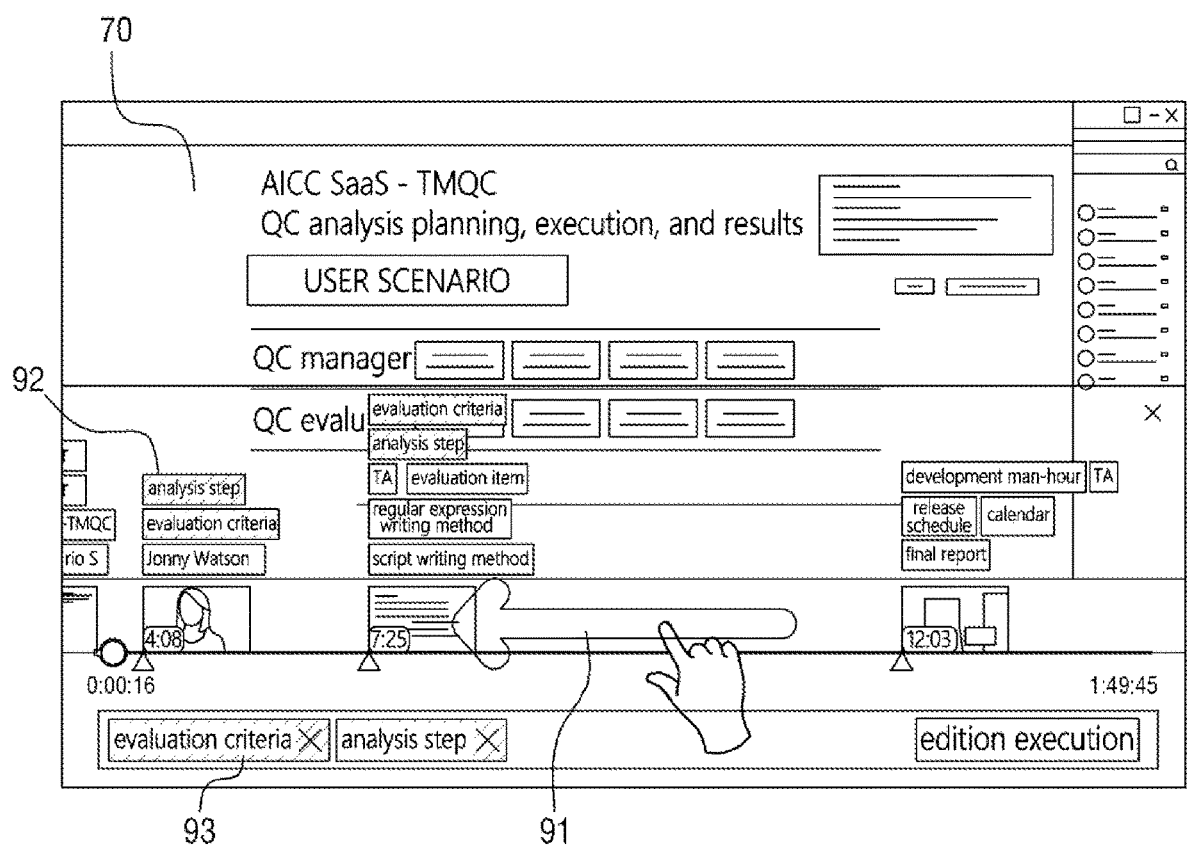
FIG. 9 is an example of an interface for adding a keyword of interest according to some exemplary embodiments of the present disclosure.

As an example, in an example illustrated in FIG. 9, in a state in which the keyword 85 selected in FIG. 8 is displayed on the keyword selection area 84, the user may search for keywords through a swipe input 91 moving left and right, and may additionally select a desired keyword 'analysis step' 92 through a long press input. In this case, the 'analysis step', which is an additionally selected keyword 93, may be displayed together with the 'evaluation criteria', which is the initially selected keyword 85, on the keyword selection area 84.

Figure 10:
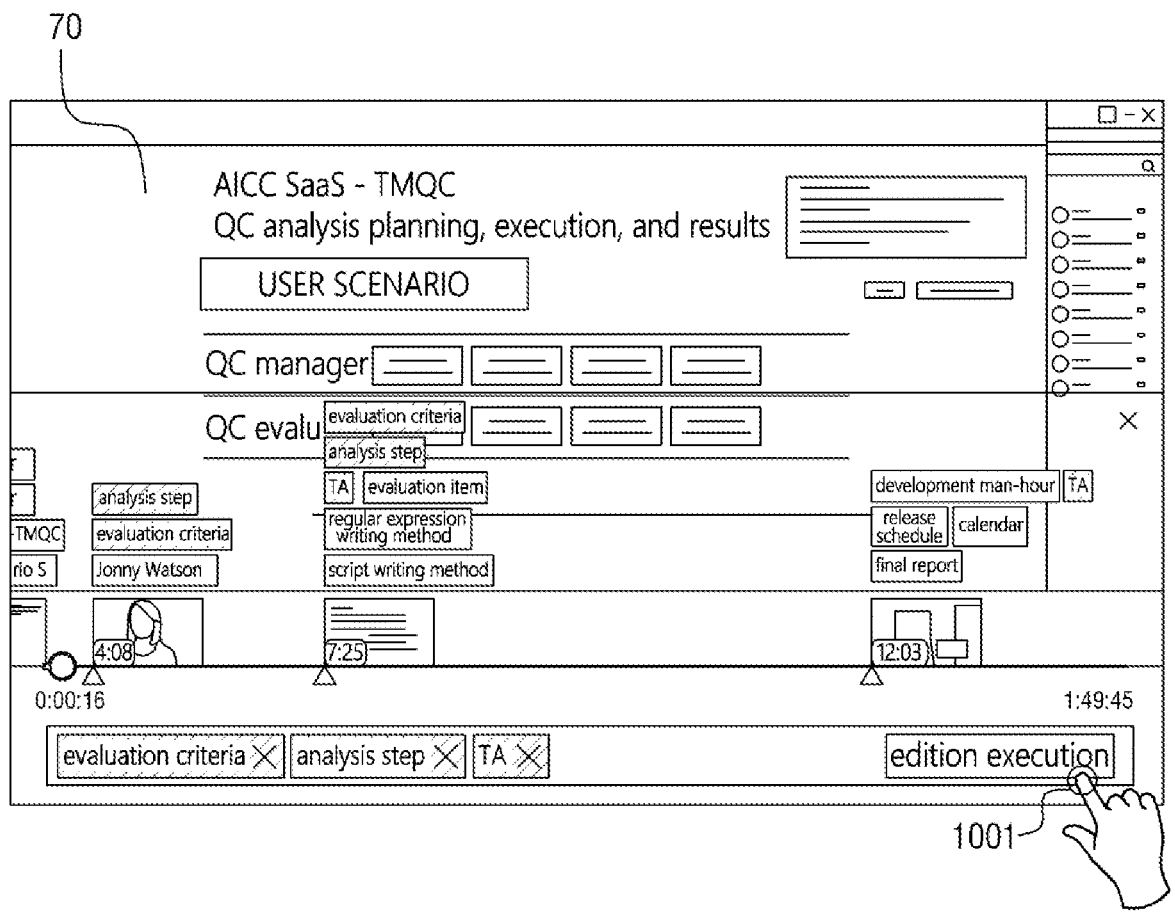
FIG. 10 is an example of generating content of interest using a selected keyword of interest according to some exemplary embodiments of the present disclosure.

Next, in an example illustrated in FIG. 10, when the user clicks an 'edit execution' button 1001 in a state in which all desired keywords are selected from the plurality of sections of the shared video 70 of the video conference and displayed on the keyword selection area 84, the content may be processed and provided.

Figure 11:
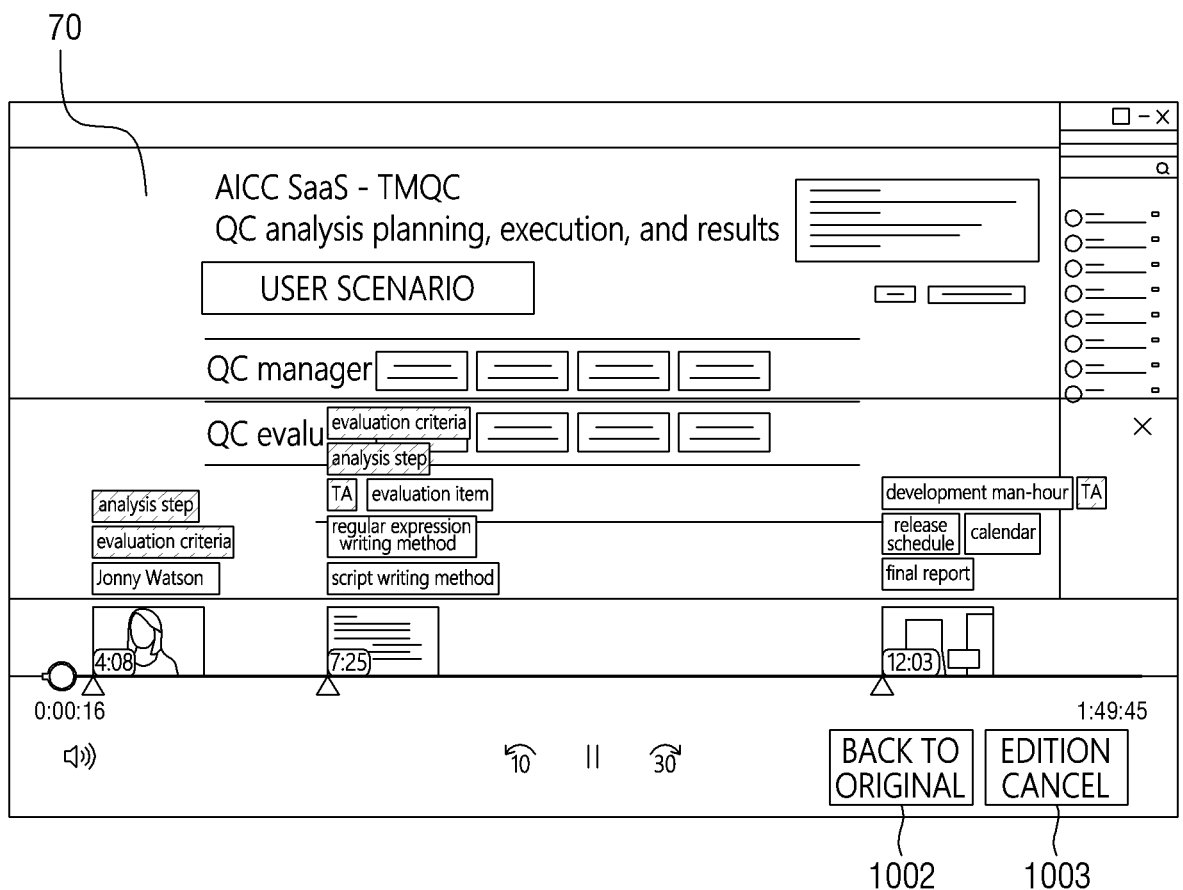
FIG. 11 is an example of an interface for adding and changing a keyword of interest according to some exemplary embodiments of the present disclosure.

As an example, as illustrated in FIG. 11, only contents of a section associated with the keywords displayed on the keyword selection area 84 may be connected and reproduced. In this case, when the content being reproduced is not the content the user wants, the user may return to a screen of an original video by clicking a 'back to original' button 1002 and select the keyword again from the beginning, or may add, delete, or change the keywords displayed on the keyword selection area 84 by clicking an 'edition cancel' button 1003.

New content of interest in which corresponding sections are combined may be provided using the finally selected keywords of interest through such a process. In this case, the content of interest may be provided only through the screen without being stored in the content providing device 10. Actual files of content of interest may be stored only in the server and shared by a plurality of users on the server 20. In this case, the content of interest stored in the server 20 may be set so as not to be downloaded to terminals of the plurality of users.

Figure 12:
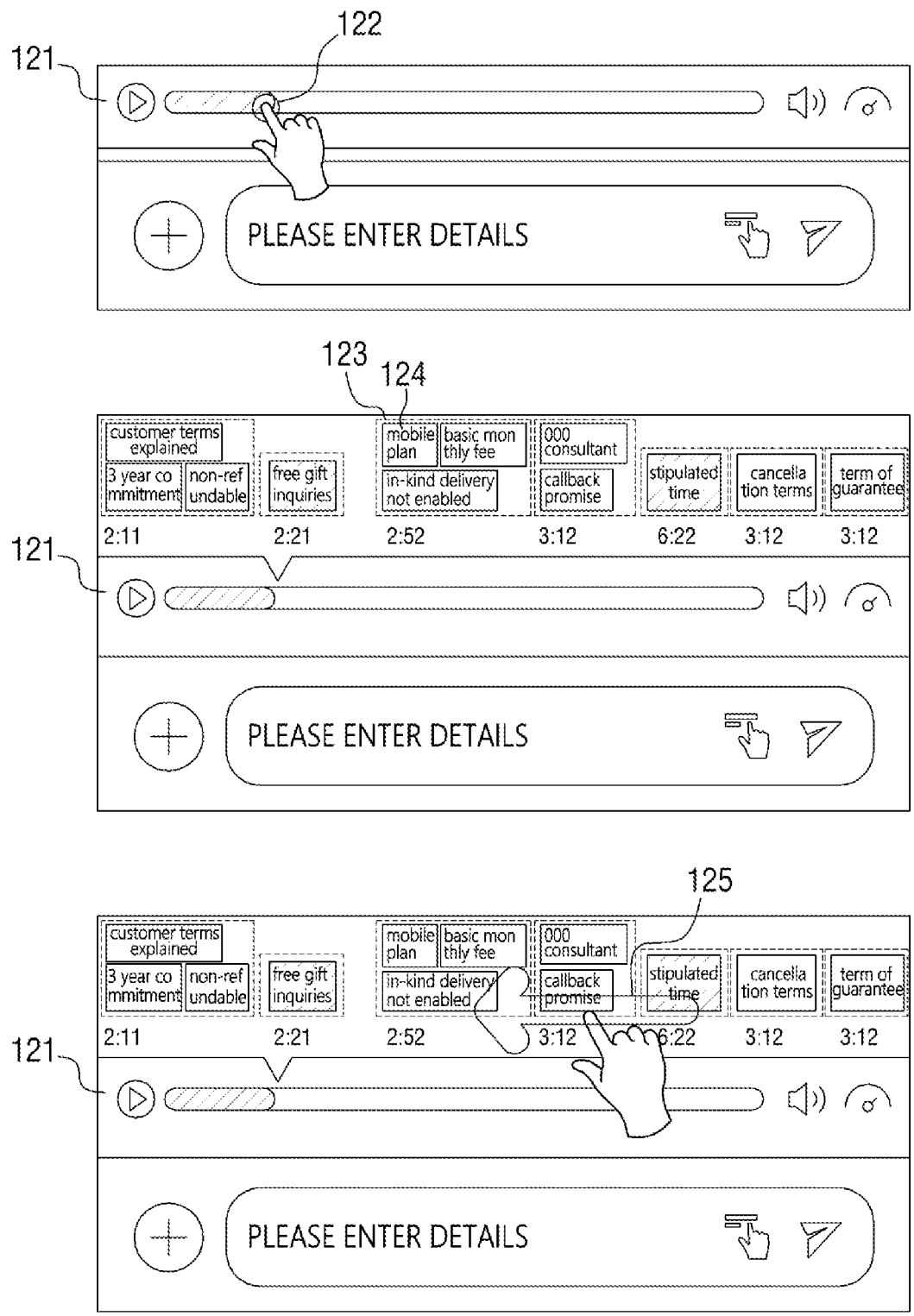
FIG. 12 is an example of displaying preview information for each section of audio content according to some exemplary embodiments of the present disclosure.
Figure 13:
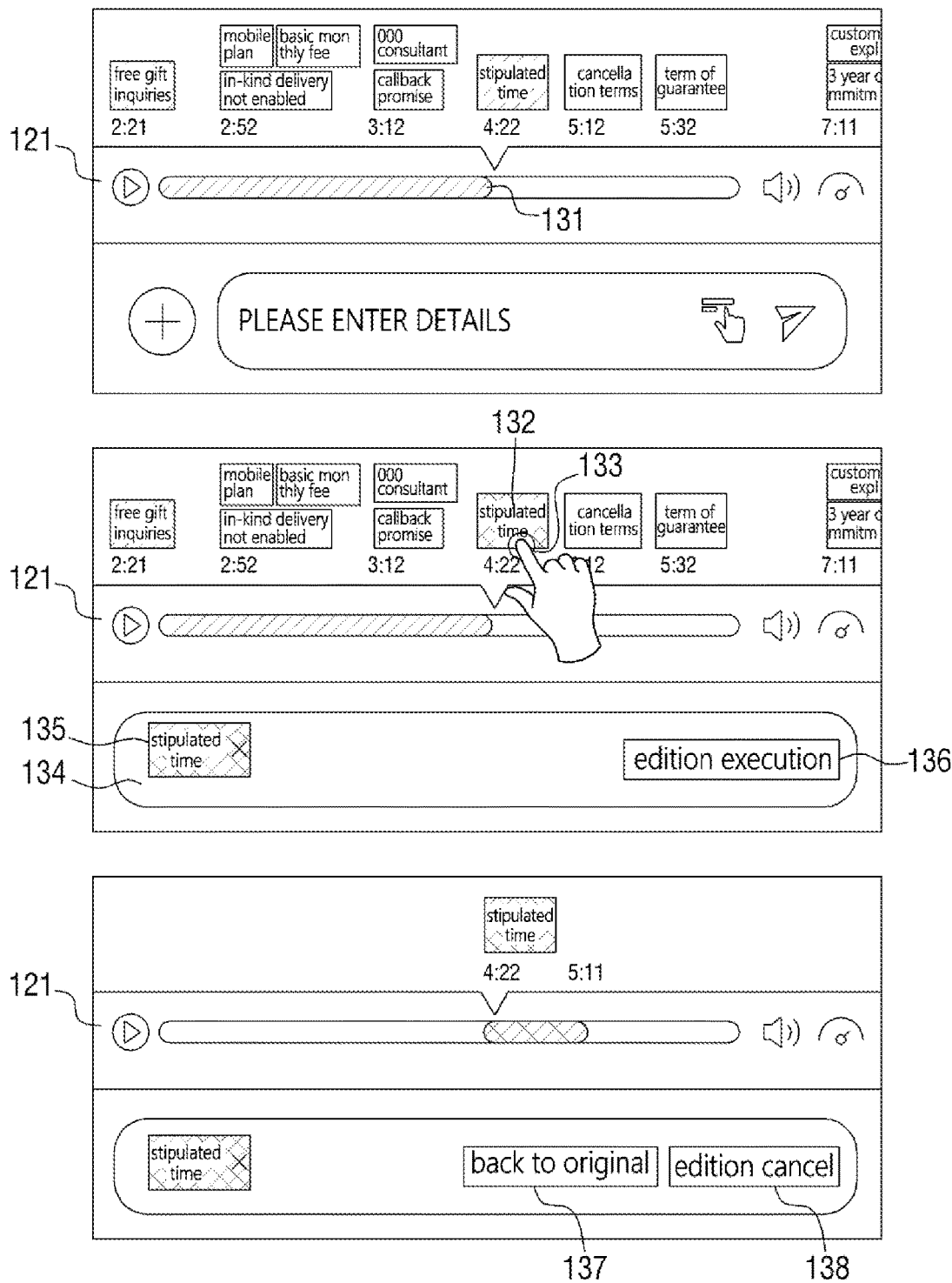
FIG. 13 is an example of selecting a keyword of interest from an entire section of content according to some exemplary embodiments of the present disclosure.

As an exemplary embodiment, referring to FIGS. 12 and 13, when a long press input 122 to a play bar 121 for reproducing audio content is received, the content providing device 10 may display a start time point of each section and a keyword group 123 including representative keywords 124 of each section, with respect to a plurality of sections divided based on a time point at which a subject or context is switched among an entire reproduction section of the audio content, In this case, a pre-listening clip representing each section of the audio content may also be displayed.

Next, when the user selects a desired keyword after searching for keywords through a swipe input 125 moving left and right, a reproduction time point in the play bar 121 may be moved to a time point 131 corresponding to the selected keyword.

In this case, when the user long-presses a desired keyword 'contracted period' 132, the 'contracted period' 135 may be displayed on a keyword display area 134, and only content of a section corresponding to the 'contracted period' may be reproduced by clicking an 'edition execution' button 136. If the 'edition execution' button is clicked after additional keywords other than the 'contract period' are selected, new content of interest in which content of a section corresponding to each of the selected keywords is connected may be reproduced.

Like the shared video of the video conference described above with reference to FIGS. 7 to 11, new content of interest, in which sections corresponding to the selected keywords are connected and reproduced from the entire reproduction section of the audio content, may be stored only in the server 20, and may be set so as not to be downloaded to the terminals of the plurality of users that are shared.

Figure 4:
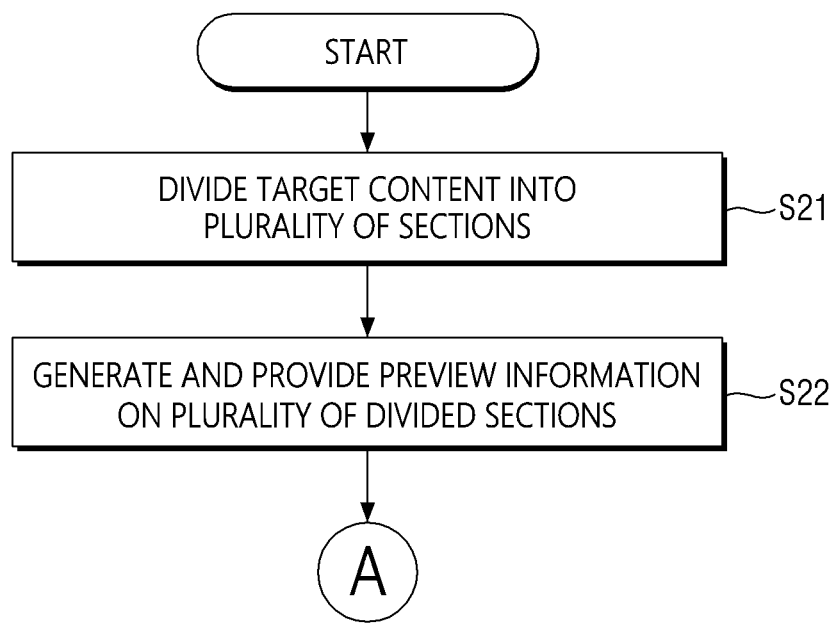
FIGS. 4 to 6 are flowcharts for explaining a content providing method performed by a server according to another embodiment of the present disclosure.
Figure 5:
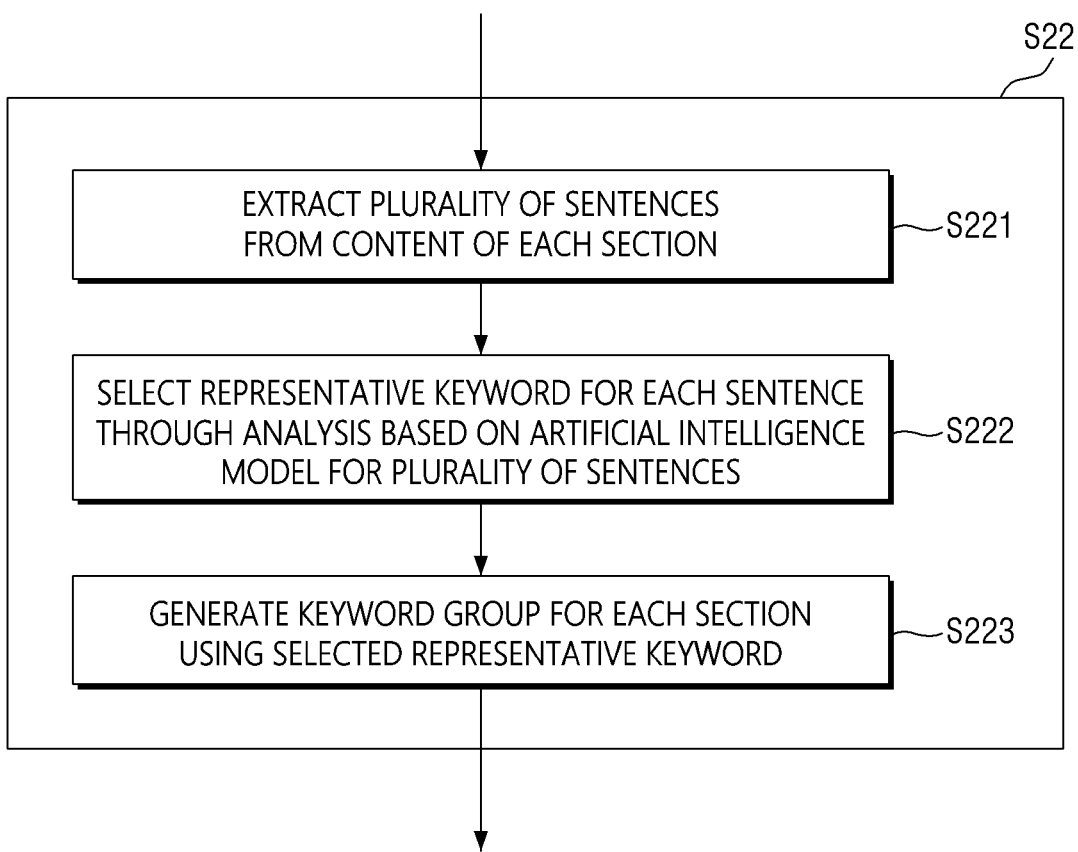
Figure 6:
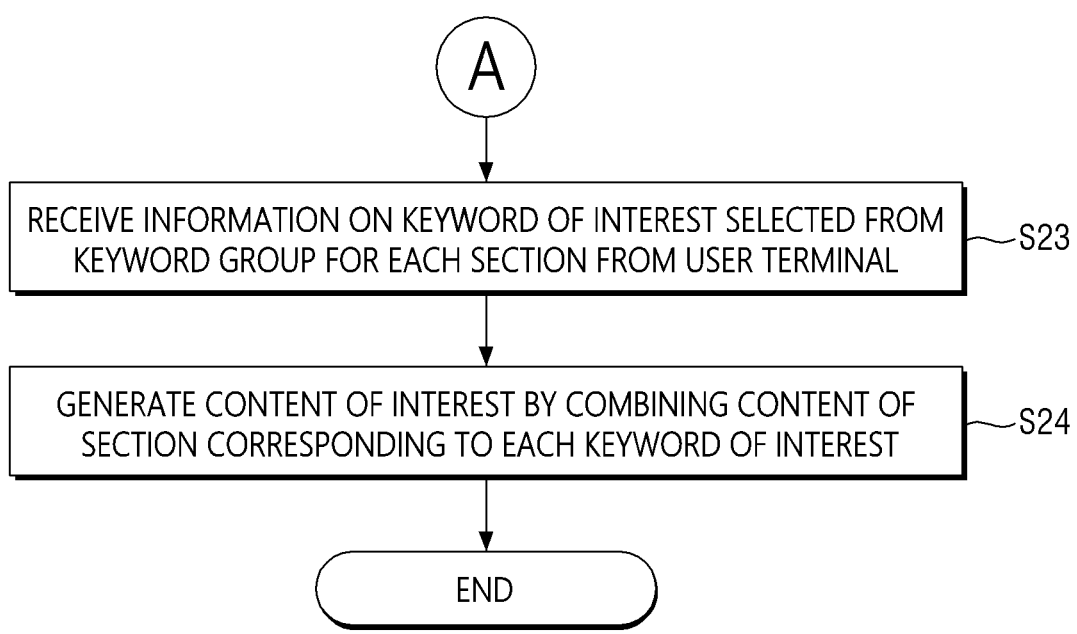

FIGS. 4 to 6 are flowcharts for explaining a content providing method performed by a server according to another embodiment of the present disclosure.

A content providing method according to an exemplary embodiment of the present disclosure may be executed by the server 20 illustrated in FIG. 1. The server 20 that executes the method according to the present exemplary embodiment may be a computing device 100 illustrated in FIG. 14. The server 20 may be, for example, a server device connected to a plurality of client devices, a stationary computing device such as a PC, or a cloud server.

It should be noted that description of a subject performing some operations included in the method according to an exemplary embodiment of the present disclosure may be omitted, and in such case, the subject is the server 20.

According to an exemplary embodiment of the present disclosure described below, preview information for each section of content may be generated and provided to a client device (e.g., the content providing device 10). In addition, new content of interest may be generated by combining contents of sections corresponding to keywords selected from the client device of a keyword group included in the preview information of each section, and may be shared among a plurality of client devices.

Referring to FIG. 4, first in operation S21, the server 20 divides target content into a plurality of sections. The target content may be video content or audio content that may be reproduced by the plurality of client devices connected to the server 20. The plurality of sections may be formed by dividing the target content based on a point at which at least one of a speaker, subject, and background image is changed.

As an exemplary embodiment, the server 20 may divide the content into the plurality of sections by analyzing the contents of the content using AI analysis technology such as OCR, text analysis, speech to text (STT), and video analysis technology, and extracting a time point at which the speech contents of the content or subject is switched through such an analysis.

Next, in operation S22, the server 20 may generate and provide preview information on the plurality of sections of the target content divided through operation S21. As an example, when the target content is selected by a user of the content providing device 10, which is one of the plurality of client devices, the preview information of the target content previously generated and stored in the server 20 may be provided to be displayed on a screen of the content providing device 10.

Referring to FIG. 5, operation S22 may include operation S221 of extracting a plurality of sentences from the content of each section, operation S222 of selecting a representative keyword for each sentence through an analysis based on an artificial intelligence model for the plurality of extracted sentences, and operation S223 of generating a keyword group for each section of the target content using the selected representative keyword.

As an exemplary embodiment, in performing operation S221, the server 20 may obtain a plurality of sentences for each section by converting video or audio into text using speech to text (STT) technology in each section of the target content. In addition, in performing operation S222, the server 20 may use, for example, a natural language processing model to extract the representative keyword from each of the plurality of sentences.

In performing operation S223, the server 20 may generate a keyword group including the representative keywords extracted from each section. In this case, the server 20 may store information on the representative keywords and the keyword group corresponding to each section. In addition, the server 20 may store information on the representative keyword corresponding to each of the plurality of sentences of each section.

Accordingly, the server 20 may provide, to the content providing device 10, the preview information including the information on the keyword group for each section of the target content generated through operations S221 to S223, and the information on the start time point for each section.

As an exemplary embodiment, referring to FIG. 6, after performing operations S21 and S22 described above, the server 20 may perform operations S23 and S24 as additional operations.

In operation S23, the server 20 receives information on one or more keywords of interest selected by a user among the keywords belonging to the keyword group for each section of the target content being displayed in the content providing device 10.

Next, in operation S24, the server 20 may generate newly processed content of interest from the target content by combining content of a section corresponding to each of the one or more keywords of interest using the information on the keyword of interest received from the content providing device 10. Accordingly, by providing the content of interest in which only the sections in which the user of the content providing device 10 is interested are connected among an entire section of the target content, the user may more quickly obtain desired information from target content.

As an exemplary embodiment, when combining the content of the section corresponding to each of one or more keywords of interest, the server 20 may continuously concatenate the content of each corresponding section after adding a margin section at the start time point and end time point of each section. In this case, the content of each section may be concatenated based on a time point ahead of the start time point of each section corresponding to each of the keywords of interest by a preset time and a time point added by a preset time from the end time point of each section Accordingly, when the sections corresponding to each of the one or more keywords of interest selected by the user of the content providing device 10 are connected, a previous section and a next section may be softly connected. That is, when switching from the previous section to the next section, the switching may be performed naturally without occurrence of a disconnection phenomenon.

As an exemplary embodiment, the server 20 may generate the content of interest in a manner of concatenating original video or audio of a sentence corresponding to each of the one or more keywords of interest among the plurality of sentences extracted from each section using the information on the keyword of interest received from the content providing device 10.

In addition, the server 20 may also generate the content of interest in a manner of concatenating original video or audio of sentences including keywords of which a degree of similarity with each of one or more keywords of interest is a reference value or more among the plurality of sentences extracted from the content of each section.

As an exemplary embodiment, the server 20 may store the content of interest generated by the methods as described above in the server 20. In this case, the stored content of interest may be shared so as to be reproduced in the plurality of client devices, but may be set so as not to be downloaded to each client device.

According to the exemplary embodiment of the present disclosure as described above, through the content analysis, it is possible to provide the information on the time point of the section in which the speaker, subject, or background is switched, and the information on the keyword for each section, and through this, the user may quickly obtain desired information from the content. In addition, it is possible to derive a number of keywords included in the content through the analysis based on the artificial intelligence model, and the user may select only the desired keyword and easily receive the newly processed content. In this case, the newly processed content may be stored only in the server, thereby strengthening a security function so that the content is not leaked.

Figure 14:
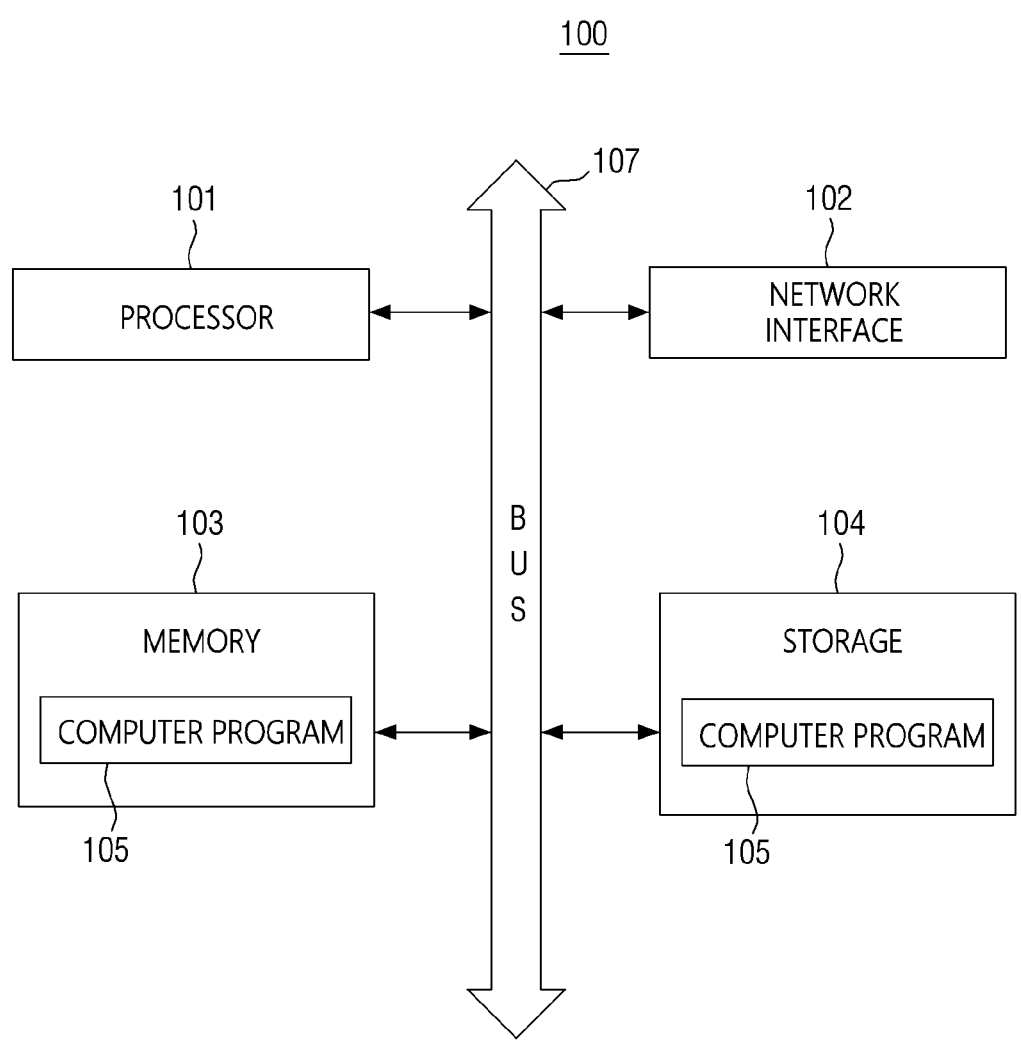
FIG. 14 is a hardware configuration diagram of an exemplary computing device capable of implementing methods according to an exemplary embodiment of the present disclosure.

FIG. 14 is a hardware configuration diagram of an exemplary computing device 100.

Referring to FIG. 14, the computing device 100 may include one or more processors 101, a bus 107, a network interface 102, a memory 103, which loads a computer program 105 executed by the processors 101, and a storage 104 for storing the computer program 105.

The processor 101 controls overall operations of each component of computing device 100. The processor 101 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 101 may perform calculations on at least one application or program for executing a method/operation according to various embodiments of the present disclosure. The computing device 100 may have one or more processors.

The memory 103 stores various data, instructions and/or information. The memory 103 may load one or more programs 105 from the storage 104 to execute methods/operations according to various embodiments of the present disclosure. An example of the memory 103 may be a RAM, but is not limited thereto.

The bus 107 provides communication between components of computing device 100. The bus 107 may be implemented as various types of bus such as an address bus, a data bus and a control bus.

The network interface 102 supports wired and wireless internet communication of the computing device 100. The network interface 102 may support various communication methods other than internet communication. To this end, the network interface 102 may be configured to comprise a communication module well known in the art of the present disclosure.

The storage 104 can non-temporarily store one or more computer programs 105. The storage 104 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 105 may include one or more instructions, on which the methods/operations according to various embodiments of the present disclosure are implemented. When the computer program 105 is loaded on the memory 103, the processor 101 may perform the methods/operations in accordance with various embodiments of the present disclosure by executing the one or more instructions.

As an exemplary embodiment, a computer program 105 may include instructions for performing an operation of obtaining preview information on a plurality of sections of target content, the preview information including a keyword group associated with content of a corresponding section, and an operation of providing the preview information on the plurality of sections together with the target content.

As another exemplary embodiment, the computer program 105 may include instructions for performing an operation of dividing the target content into a plurality of sections, and an operation of generating and providing preview information on the plurality of divided sections, the preview information including a keyword group associated with content of a corresponding section.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the example embodiments without substantially departing from the principles of the present disclosure. Therefore, the disclosed example embodiments of the disclosure are used in a generic and descriptive sense only and not for purposes of limitation.

What is claimed is:

1. A content providing method performed by a computing device, the content providing method comprising:
    obtaining preview information on a plurality of sections of target content, the preview information including a keyword group having keywords associated with each section of the target content;
    displaying the keywords corresponding to the each section on each of the plurality of sections together with the target content;
    in response to receiving a selection of a first keyword among keywords displayed in a first section, displaying the first keyword on one area of a screen and identifying both the first section and a second section corresponding to the first keyword displayed on the one area; and generating and displaying a content of interest in which combines the first section and the second section.

2. The content providing method of claim 1, wherein the plurality of sections are formed by dividing the target content based on a point at which at least one of a speaker, subject, and background image is changed.

3. The content providing method of claim 1, wherein the providing of the preview information on the plurality of sections together with the target content includes displaying a representative time point for each section of the target content and keywords included in the keyword group.

4. The content providing method of claim 3, further comprising reproducing content of a section corresponding to a keyword in response to a user input for the keyword among the keywords included in the keyword group displayed for each section.

5. A content providing method performed by a server, the content providing method comprising:

dividing target content into a plurality of sections;

generating and providing preview information on the plurality of divided sections, the preview information including a keyword group having keywords associated with content of a corresponding section;

receiving, from a user terminal, information on a first keyword selected among keywords displayed in a first section of the target content;

identifying both the first section and a second section corresponding to the selected first keyword; and generating a content of interest in which combines the first section and the second section.

6. The content providing method of claim 5, wherein the plurality of sections are formed by dividing the target content based on a point at which at least one of a speaker, subject, and background image is changed.

7. The content providing method of claim 5, wherein the generating and providing of the preview information on the plurality of divided sections includes:

extracting a plurality of sentences from the content of each section;

selecting a representative keyword for each sentence through an analysis based on an artificial intelligence model for the plurality of extracted sentences; and generating a keyword group for each section of the target content using the selected representative keyword.

8. The content providing method of claim 5, wherein the generating of the content of interest includes adding a margin section at a start time point and an end time point of each section when combining the content of the section corresponding to the selected first keyword.

9. The content providing method of claim 8, wherein the adding of the margin section at the start time point and the end time point of each section includes combining the content of each section based on a time point ahead of the start time point of each section by a first time and a time point added by a second time from the end time point of each section.

10. The content providing method of claim 5, wherein the generating of the content of interest includes generating the content of interest by using a sentence corresponding to each of the selected first keyword among a plurality of sentences extracted from the content of each section.

11. The content providing method of claim 5, wherein the generating of the content of interest includes generating the content of interest by using sentences of which a degree of similarity with each of the selected first keyword is a reference value or more among a plurality of sentences extracted from the content of each section.

12. The content providing method of claim 5 further comprising storing the generated content of interest, wherein the content of interest 1s set so as not to be downloaded to the user terminal.

13. A content providing device comprising:

a communication unit configured to communicate with an external device;

a display unit configured to display information; and a control unit configured to:

obtain preview information on a plurality of sections of target content, the preview information including a keyword group having keywords associated with each section of the target content, to control the display unit to display the keywords corresponding to the each section on each of the plurality of sections together with the target content, in response to receiving a selection of a first keyword among keywords displayed in a first section, to display the first keyword on one area of a screen and to identify both the first section and a second section corresponding to the first keyword displayed on the one area, and to generate and display a content of interest in which combines the first section and the second section.

14. The content providing device of claim 13, wherein when a type of the target content is video, the preview information includes a video thumbnail in each section of the video.

15. The content providing device of claim 13, wherein when a type of the target content is audio, the preview information includes a pre-listening clip in each section of the audio.

16. The content providing device of claim 13, wherein the plurality of sections are formed by dividing the target content based on a point at which at least one of a speaker, subject, and background image is changed.

17. The content providing device of claim 13, wherein the control unit is configured to display a representative time point for each section of the target content and keywords included in the keyword group.

* * * * *